United States Patent [19]
Baker, Jr.

[11] Patent Number: 6,053,193
[45] Date of Patent: Apr. 25, 2000

[54] CYCLING, SELF CHECKING PRESSURE SENSING SYSTEM

[76] Inventor: G. Paul Baker, Jr., 1018 Laurel Ave., Denham Springs, La. 70726

[21] Appl. No.: 09/139,851
[22] Filed: Aug. 25, 1998

Related U.S. Application Data

[60] Provisional application No. 60/056,781, Aug. 25, 1997.
[51] Int. Cl.⁷ .................................................. F16K 37/00
[52] U.S. Cl. ............................................ 137/14; 137/557
[58] Field of Search ...................................... 137/14, 557

[56] References Cited

U.S. PATENT DOCUMENTS 4,961,441  10/1990  Salter ........................................ 137/14

Primary Examiner—Gerald A. Michalsky
Attorney, Agent, or Firm—Phelps Dunbar

[57] ABSTRACT

Cycling, self checking parameter sensing systems that continuously cycle such that the user of the monitoring system can determine not only if the vessel being monitored is above or below the desired parameter value, but also whether or not the monitoring system is functional. When the parameter being monitored is pressure, a system pressure chamber is attached to the vessel being monitored, and the pressure in this chamber is cycled to constantly test the function of the system components. The cycle is monitored for any irregularities.

5 Claims, 3 Drawing Sheets

CYCLING, SELF CHECKING PRESSURE SENSING SYSTEM

This application claims the benefit of U.S. Provisional Application Ser. No. 60/056,781 filed Aug. 25, 1997.

BACKGROUND OF THE INVENTION

This invention relates in general to systems that monitor parameters in industrial processes for parameter values that are outside of the desired norm, and in particular to systems that monitor pressure vessels for over pressure or under pressure situations, and to equipment that is to be used in connection with devices that automatically shut down a process when an over pressure or under pressure situation could threaten to rupture or collapse the pressure vessel.

Industrial operations, particularly those that include pressure sensitive operations, often require devices that monitor pressure vessels for over pressure or under pressure situations. These monitors are connected to devices which may automatically shut down the industrial process in an over or under pressure situation. One of the problems with these systems is the inability to know if the monitoring system is actually functioning. For example, process materials may clog a sensing port, or otherwise prevent the pressure sensing device from properly monitoring system pressure. In instances where the monitoring system is relied upon to cause the emergency shut down of the process, it is critical that the system either function with 100% reliability, or that the system somehow alert the operator of the facility that it is not working properly, so that it call be repaired. Engineers have improved the reliability of critical shutdown system components in order to improve the level of safety of a production process. However, while the reliability of monitoring systems has improved, they still are not 100% reliable. Furthermore, it would be foolish to assume that a given system is 100% reliable, given the dangerous consequences of vessel failure in an industrial process. Accordingly, it is most important to know when a monitoring system has failed.

SUMMARY OF THE INVENTION

The instant invention provides a method and apparatus for monitoring process parameters in a manner that also informs the operator of the status of the monitoring system. Failure of the monitoring system is readily identified, allowing for repair or replacement of the monitoring system, limiting the risk of an un-monitored out of norm parameter value.

The instant invention creates a cycle that is monitored for irregularities in that cycle. A parameter sensing device is connected to a system to be monitored for the value of that parameter. The sensing device is then subjected to an artificially induced value of the parameter being monitored, such that a parameter value set point is reached. The reaching of this set point then triggers the cessation of the artificially induced value of the parameter. The parameter sensing device then returns to its initial state—that of monitoring the value of the parameter in the system to be monitored. However, since the parameter set point is no longer being reached (assuming the value of the parameter in the system being monitored has not reached the set point) this in turn triggers the artificial induction of the value of the parameter. Accordingly, a cycle is created, wherein the parameter value measured by the sensing device reaches the set point of the sensing device, and then returns to a value not reaching the set point. The cycle is disrupted if the equipment that creates the cycle malfunctions in any way, or if the parameter value in the system being monitored has reached the set point. In this manner the invention not only monitors the parameter in the system being monitored, but also continuously checks to insure that the monitoring equipment is functioning properly. Disruptions in the cycle are recognized by a device, such as a computer, that monitors the cycle, and alerts the operator of the system to a potential problem.

A parameter that is often monitored is pressure in pressure vessels. In such an instance the instant invention may utilize a system chamber that is attached to the vessel to be monitored. The pressure in the system chamber is periodically raised using an independent gas source, until a high pressure switch attached to the system chamber is triggered (in an over pressure monitoring situation). This switch then triggers the opening of a solenoid valve, which in turn allows the gas in the system chamber to be released into the vessel being monitored, lowering the pressure in the system chamber. The system chamber may be any convenient size, and may be incorporated into the valve mechanism that connects the instant invention to the vessel to be monitored. When the pressure in the system chamber reaches a level below the set point of the high pressure switch, the solenoid valve is caused to close, which starts the cycle over again.

This pressure cycle in the system chamber is monitored. Changes in the cycle inform the operator of a problem with the monitoring system, or of an over pressure or under pressure situation in the pressure vessel.

BRIEF DESCRIPTION OF THE DRAWINGS

Reference will be made to the drawings wherein like parts are designated by like numerals and wherein.

DETAILED DESCRIPTION OF THE PREFERRED EMBODIMENT

Figure 1:
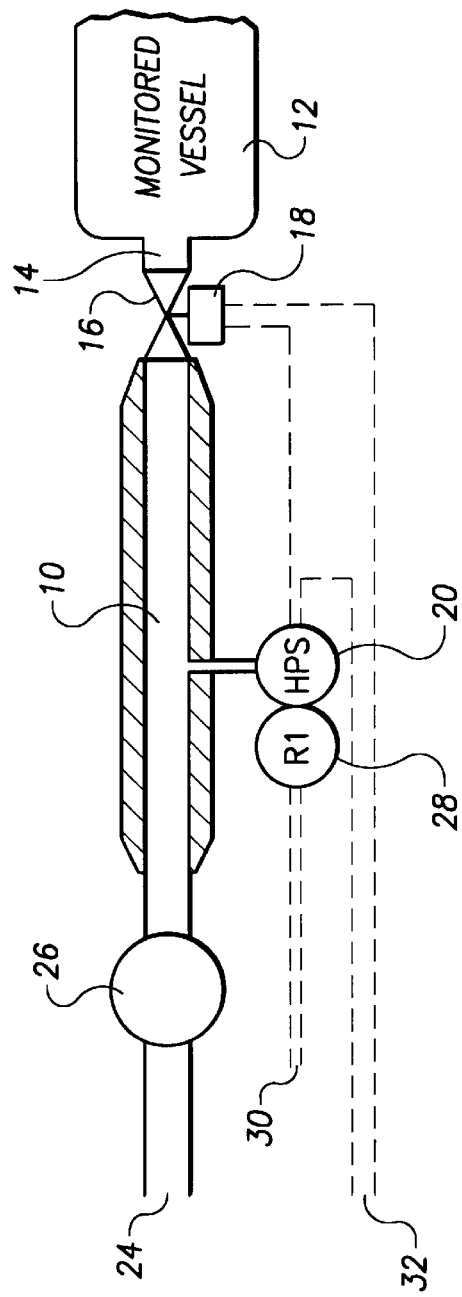
FIG. 1 is a plan view of a high pressure monitoring system of the instant invention.

Over Pressure Monitoring:

The vessel (12) is to be monitored for an over pressure situation. Current practice would be to simply place a high pressure switch directly on a sensing port (14) of the vessel (12). This provides no information to the operator on whether the high pressure switch is actually operable, or if the sensing port (14) is clogged. The instant invention instead attaches a system chamber (10) to the sensing port (14) of the vessel (12) to be monitored, as shown in FIG. 1. A valve (16) operated by a solenoid (18) is placed in line between the system chamber (10) and the sensing port (14). A high pressure switch (20) is connected to the system chamber (10). The solenoid (18) is connected to the high pressure switch (20), such that the valve (16) is caused to open when the pressure in the system chamber (10) is higher than the set point of the high pressure switch (20). The system chamber (10) is also connected to a gas source (24) which constantly supplies gas to the system chamber (10) through a constant flow regulator (26). The gas source (24) is maintained at a pressure that is greater than the set point of the high pressure switch (20).

In use, when the pressure in the system chamber (10) is lower than the set point of the high pressure switch (20), the solenoid (18) places the valve (16) in the closed position. Gas continues to enter the system chamber (10) through the constant flow regulator (26) from the gas source (24), causing the pressure in the system chamber (10) to rise. When the pressure in the system chamber (10) reaches the set point of the high pressure switch (20), the switch is triggered, which in turn causes the solenoid (18) to activate, opening the valve (16). The gas in the system chamber (10) then escapes into the monitored vessel (12) though the valve (16) and sensing port (14), assuming that the pressure in the vessel (12) is lower than the pressure in the system chamber (10). As the gas escapes the system chamber (10) the pressure in the system chamber (10) is reduced until it falls below the set point of the high pressure switch (20). The high pressure switch (20) then resets, causing the solenoid (18) to close the valve (16), and the cycle begins again.

The cycling of the high pressure switch (20) also triggers a relay (28) which is connected to a sensing device (30). The sensing device (30) monitors the cycle of the high pressure switch (20). This may be accomplished by monitoring the changing current demands placed upon the power source (32) or by monitoring the contacts of the high pressure switch (20). Any change in the cycle signals either an over pressure event in the vessel (12), or a problem with the monitoring system. If, for example, there is an over pressure situation in the vessel (12), then, when the valve (16) opens, the pressure in the system chamber (10) will not fall below the set point of the high pressure switch (20). The cycling will stop, and the sensing device (30) will alert the operator, or automatically take appropriate action. The sensing device (30) may be a computer programmed to recognize irregularities in the cycle. The cycle can also be interrupted due to problems with the monitoring system. For example, if the sensing port (14) is clogged, then the gas in the system chamber (10) will not be able to escape into the vessel (12), meaning that the pressure will not fall below the set point of the high pressure switch (20), disrupting the cycle. Any failure in the flow of gas from the gas source (24) through the constant flow regulator (26) will also interrupt the cycle. A failure of the high pressure switch (20) will also interrupt the cycle.

The likelihood of clogging of the sensing port (14) is reduced by the release of gas through the valve (16) and sensing port (14) with every cycle of the monitoring system. It is envisioned that Nitrogen, being inert, would most often be the preferred gas. However, any gas compatible with the process occurring in the vessel (12) could be used.

The system continuously checks for an over pressure situation on the monitored vessel (12) as well as the failure of any component of the monitoring system. The frequency of the cycle can be adjusted by placing a restriction orifice a the mouth of the sensing port (14) or at the inlet or outlet of the valve (16). In this manner the time required for the monitored vessel (12) to lower the pressure in the system chamber (10) can be increased.

Figure 2:
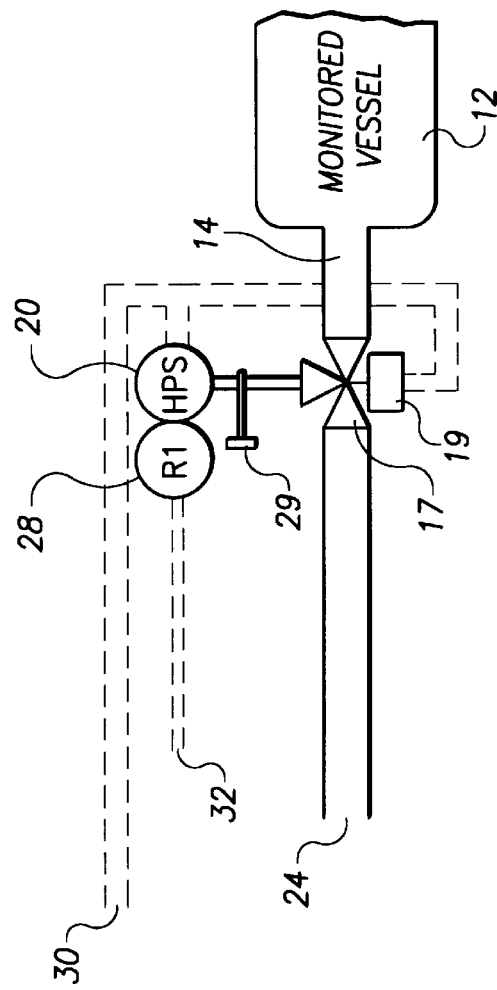
FIG. 2 is a plan view of another embodiment of a high pressure monitoring system of the instant invention.

In another embodiment of the system monitoring for an over pressure situation, as shown in FIG. 2, the high pressure switch (20) is connected directly to a three way valve (17) controlled by solenoid (19). The high pressure switch (20) is connected directly to the common port of the three way valve (17) and will be connected to the gas source (24) when the solenoid valve is energized. The solenoid valve will be energized when the high pressure switch (20) senses a pressure below its set point. When the solenoid is energized, connecting the gas source (24) to the high pressure switch (20), the gas will cause the set point of the high pressure switch (20) to be exceeded, causing the high pressure switch (20) to open, de-energizing the solenoid (19). De-energized, the solenoid (19) causes the three way valve (17) to block in the gas source (24) and connect the high pressure switch (20) to the monitored vessel (12). The gas will escape into the monitored vessel (assuming the vessel is not in an over pressure state), until the pressure is reduced below the set point of the high pressure switch (20). When the pressure is reduced below the set point, the high pressure switch (20) closes, causing the solenoid (19) to energize, which starts the cycle over again. The cycle will continue until one of the components fails, or the pressure in the monitored vessel is above the set point of the high pressure switch (20). The needle valve (29) between the common port of the three way valve (17) and the high pressure switch (20) can be adjusted to extend or shorten the time required for the pressurized gas to escape into the monitored vessel, thereby extending or shortening the cycling frequency. The sensing device (30) may monitor the cycling by detecting the changing current in the power source (32), or by monitoring the contacts of the high pressure switch (20).

Figure 3:
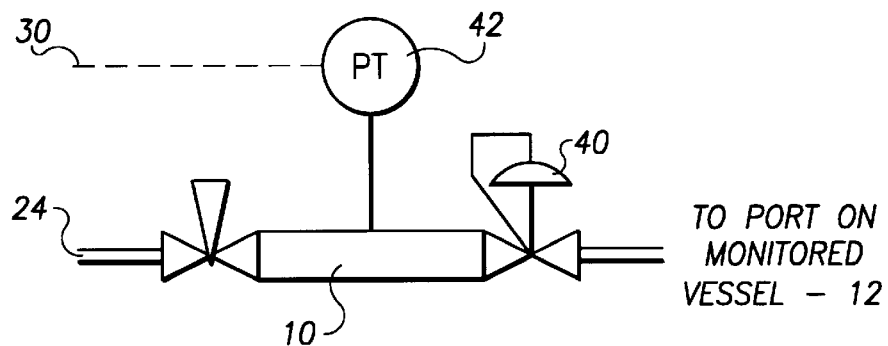
FIG. 3 is a plan view of another embodiment of a high pressure monitoring system of the instant invention.

In another embodiment of the system monitoring for an over pressure situation, as shown in FIG. 3, the system chamber (10) is connected to a sensing port (14) of the vessel (12) to be monitored. However, in this embodiment the connection between the system chamber (10) and sensing port (14) includes a back pressure regulator valve (40). As gas is fed into the system chamber (10) from the gas source (24) through the constant flow regulator (26), the pressure in the system chamber (10) rises until the set point of the back pressure regulator (40) is reached, whereupon the back pressure regulator valve (40) opens, allowing gas to escape into the sensing port (14) and vessel (12). As before, this tends to prevent the sensing port (14) from clogging with process material. Once the pressure in the system chamber (10) drops below the set point of the back pressure regulator valve (40), the valve closes, and the pressure begins to rise again, as gas fills the system chamber (10), and the cycle begins anew. In this embodiment the cycle is sensed by a pressure transmitter (42) which monitors the pressure in the system chamber (10). The pressure transmitter sends a signal to the sensing device (30) which determines if the cycle continues. If the cycling stops, the sensing device (30) will alert the operator, or automatically take appropriate action. If the vessel (12) is over pressured, the back pressure regulator valve (40) will open, raising the pressure in the system chamber (10) upsetting the cycle. Also, any failure of the back pressure regulator valve (40), the pressure transmitter (42), the constant flow regulator (26), and/or the gas source (24), will cause the cycle to be altered, which will be noted by the sensing device (30).

A pressure transmitter (42) could also be used with the first embodiment (FIG. 1) to record the pressure at which the high pressure switch (20) was triggered. A change in the high pressure set point would indicate a problem with either the high pressure switch (20), or the pressure transmitter (42). The pressure transmitter signal (42) could also be used to activate the solenoid (18), replacing the high pressure switch (20) in that function.

The frequency of the cycle will also be impacted by the pressure in the vessel (12). The higher the pressure in the vessel (12) the longer it will take for the gas to flow from the system chamber (10) into the vessel (12). The length of the cycle could be compared to the pressure in the vessel (12) as an additional check on the proper operation of the system. Changes in the cycle frequency that do not correlate to changes in the pressure in the vessel (12) can be used as indicators that some degradation of the system is underway and preventative maintenance may be needed.

Figure 4:
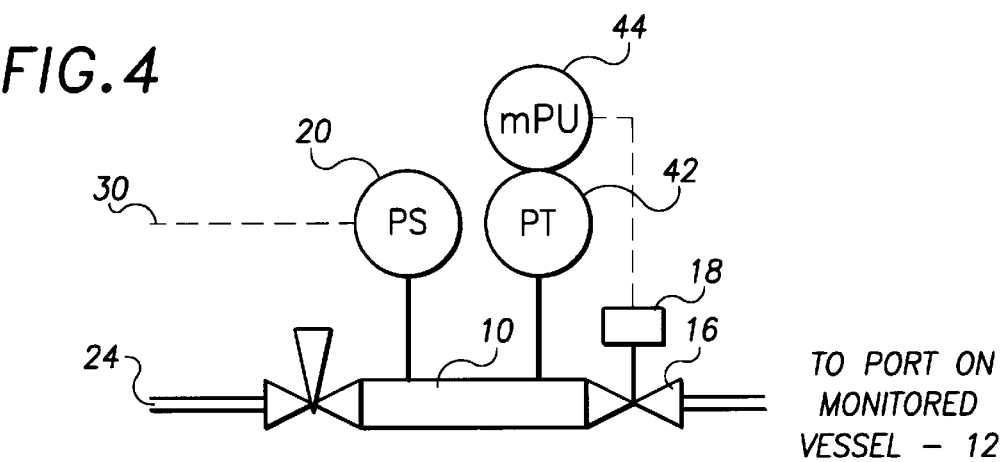
FIG. 4 is a plan view of another embodiment of a high pressure monitoring system of the instant invention.

In yet another embodiment of the system monitoring for an over pressure situation, as shown in FIG. 4, a microprocessor (44) is connected to a pressure transmitter (42) that is connected to the system chamber (10). The microprocessor (44) is programed to open and close the valve (16) through use of the solenoid (18) at certain pressures sensed by the pressure transmitter (42). A high pressure switch (20) is also attached to the system chamber (10) and is connected to the sensing device (30). Monitoring of the cycles of the pressure switch (20) and/or the pressure cycles as sensed by the pressure transmitter (42) and recognition of any changes in this cycle (particularly changes that do not correspond to changes in the pressure in the vessel (12)) can be used to inform the operator of an over pressure situation or of a failure or degradation of the monitoring system.

Figure 5:
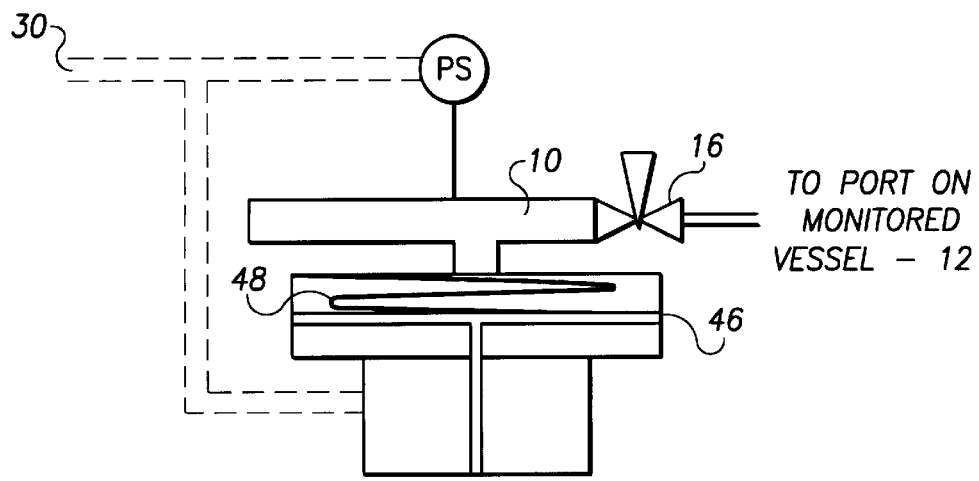
FIG. 5 is a plan view of another embodiment of a high pressure monitoring system of the instant invention.

In yet another embodiment of the system monitoring for an over pressure situation, as shown in FIG. 5, the means to raise the pressure in the system chamber (10) is a diaphragm or piston (46) that moves to reduce the volume of the system chamber (10), thereby raising the pressure in the system chamber (10) to a point above the set point of the high pressure switch (20). The solenoid (18) is made to open and close valve (16) in concert with the movement of the diaphragm or piston (46), or in relation to the status of the high pressure switch. When the high pressure switch (20) set point is exceeded the valve (16) is caused to open. A spring (48) may be used to assist the motion of the diaphragm or piston (46).

Certain industrial processes may require immediate shutdown in over pressure or under pressure situations due to safety concerns. However, system shutdowns can be expensive. Use of multiple monitoring devices of the type described herein will essentially eliminate false shutdowns, while insuring that a dangerous over or under pressure situation is dealt with appropriately. Where two or more monitoring systems are in place on a pressure vessel, and only one of these systems experiences a change in the normal system cycle, it will be evident that the problem is with the monitoring system, not a vessel pressure that requires shutdown. Only if the cycles of both monitoring systems change will shutdown be required.

Figure 6:
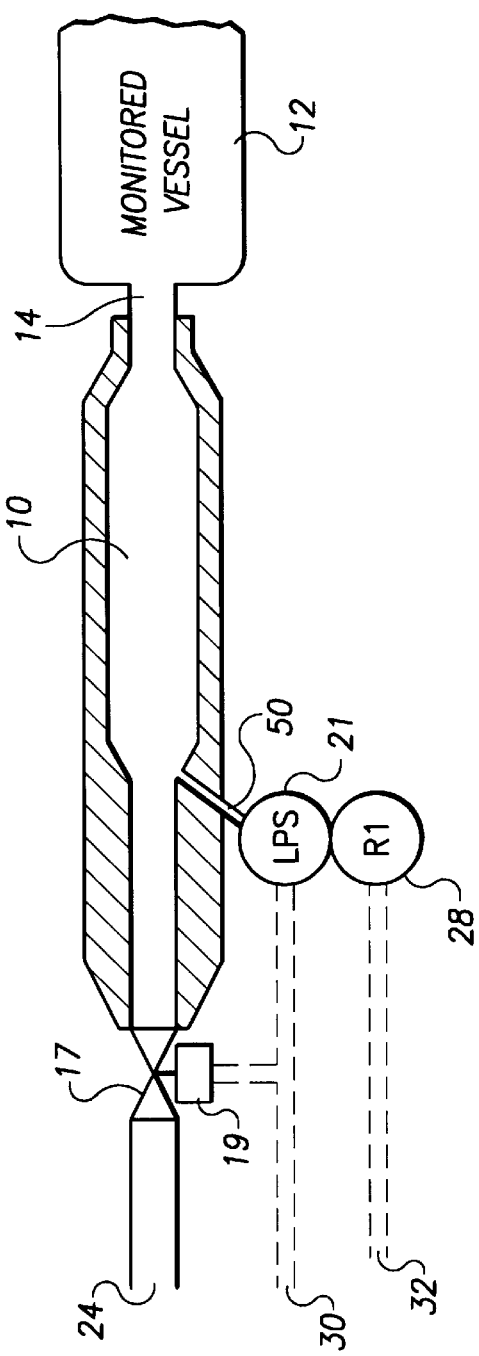
FIG. 6 is a plan view of a low pressure monitoring system of the instant invention.

Low Pressure Monitoring:

Some industrial processes require shutdown systems in case of under pressure situations to prevent the collapse of a vessel. The device to monitor for under pressure situations is shown in FIG. 6, and comprises a system chamber (10), connected to a sensing port (14) of the vessel (12) to be monitored. The system chamber (10) is also connected to a gas source (24) using a valve (17) controlled by solenoid (19). A low pressure switch (21) is connected to eductor tube (50) which is connected to the system chamber (10).

In use, the valve (17) opens, causing gas to flow toward the monitored vessel (12), which is at a lower pressure than the gas source (24). As the gas flows past the eductor tube (50), the pressure sensed by the low pressure valve (21) is reduced until the set point is reached. This causes the solenoid (19) to cause the valve (17) to close, stopping the flow of gas into the system chamber (10). The pressure sensed by the low pressure switch (21) then rises above the set point of the low pressure switch (21), and the cycle begins again.

As with the high pressure systems described above, the cycle of the low pressure switch (21) is monitored by a sensing device (30). Any change in the cycle is evidence of either a problem with the monitoring system, or a vessel under pressure situation.

Figure 7:
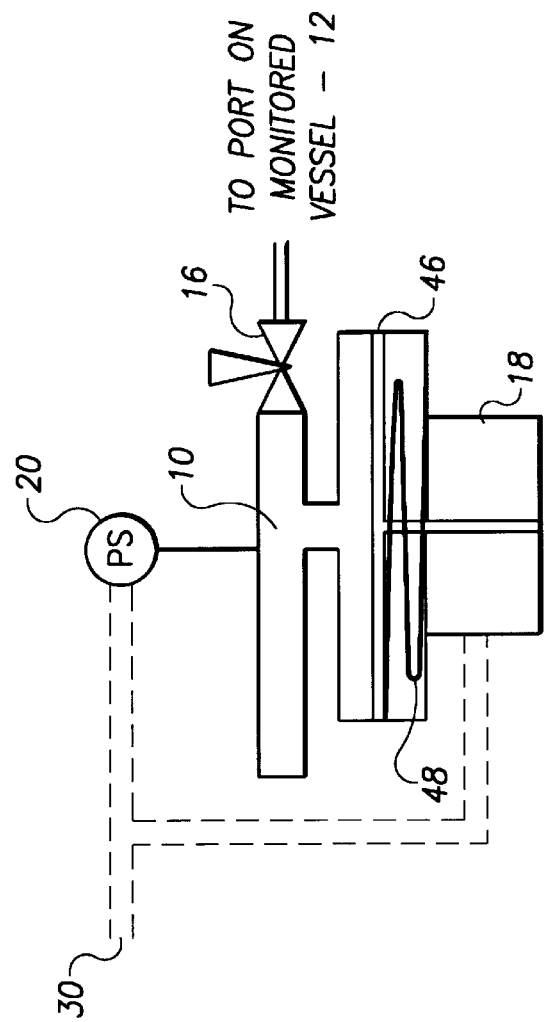
FIG. 7 is a plan view of another embodiment of a low pressure monitoring system of the instant invention.

An alternative embodiment of the low pressure monitoring system is shown in FIG. 7. As with the high pressure monitoring system shown in FIG. 5, the gas source (24) has been replaced with a diaphragm or piston (46) that moves to increase the volume of the system chamber (10) in concert with the closing of valve (16), thereby lowering the pressure in the system chamber (10) below the set point of the low pressure switch (20). When the low pressure switch (20) reaches its set point, the diaphragm or piston (46) is caused to return to its original position, at the same time as the valve (16) opens to connect the system chamber (10) with the vessel being monitored (12). A spring (48) may be used to assist the movement of the diaphragm or piston. Any change in the cycle, as monitored by the sensing device (30), signals either a problem with the monitoring device, or a low pressure situation in the vessel (12).

It is intended that the foregoing detailed description be regarded as illustrative rather than limiting and that it is understood that the following claims including all equivalents are intended to define the scope of the invention.

What I claim is:

1. A cycling, self checking parameter monitoring system comprising;

a parameter sensing switch with parameter value set point, said parameter sensing switch being connected to a system to be monitored, whereby the parameter in the system is sensed by said parameter sensing switch, means to alter the value of the parameter applied to said parameter sensing switch without significantly altering the value of the parameter in the system to be monitored, whereby said parameter value set point is reached, said means to alter being triggered by said parameter sensing switch not having reached said parameter value set point, means to terminate the application of said means to alter, said means to terminate being triggered by said parameter sensing switch having reached said parameter value set point, whereby said parameter sensing switch returns to sensing the parameter in the system to be monitored, which in turn again triggers said means to alter the value of the parameter, provided the value of the parameter in the system to be monitored has not reached said set point, and means to recognize and monitor irregularities in the cycle created by the operation of said means to alter the value of the parameter and said means to terminate.

2. A cycling, self checking parameter monitoring system as in claim 1 further comprising means to isolate said parameter sensing switch from the system to be monitored when said means to alter is triggered.

3. A process for monitoring a system parameter, comprising the steps of;

connecting a parameter sensing switch with parameter value set point to a system to be monitored, whereby the parameter in the system is sensed by said parameter sensing switch, altering the value of the parameter applied to said parameter sensing switch without significantly altering the value of the parameter in the system to be monitored, said altering of the value to occur whenever said parameter sensing switch has not reached said parameter value set point, whereby said parameter value set point is reached, terminating the altering of the value of the parameter applied to said parameter sensing switch whenever said parameter value set point is reached, whereby said parameter sensing switch returns to sensing the parameter in the system to be monitored, which in turn again triggers the altering of the value of the parameter applied to said parameter sensing switch, provided the value of the parameter in the system to be monitored has not reached said parameter value set point, and recognizing and monitoring irregularities in the cycle created by altering and terminating the value of the parameter applied to said parameter sensing switch.

4. A process for monitoring a system parameter as in claim 3 further comprising the step of isolating said parameter sensing switch from the system to be monitored when altering the value of the parameter applied to said parameter sensing switch.

5. A vessel pressure monitoring system comprising;

a three way valve with a common port, said three way valve attached to a vessel to be monitored for excess pressure at one of the non-common ports of said three way valve, a high pressure switch with a high pressure set point, attached to the common port of said three way valve, a gas source attached to said three way valve at one of the non-common ports, containing gas at a pressure higher than said set point of said high pressure switch, means for opening and closing said three way valve that depends upon the pressure sensed by said high pressure switch, whereby said common port of said three way valve is connected to said gas source when the pressure sensed by said high pressure switch is less than said set point of said high pressure switch, and whereby said common port of said three way valve is connected to said vessel to be monitored when the pressure sensed by said high pressure switch is greater than said set point of said high pressure switch, and means to recognize and monitor irregularities in the cycles of said high pressure switch.

* * * * *